US007890074B2

(12) United States Patent
Shinbo et al.

(10) Patent No.: US 7,890,074 B2
(45) Date of Patent: Feb. 15, 2011

(54) DATA ACQUISITION SYSTEM

(75) Inventors: Kenichi Shinbo, Yokohama (JP); Fujio Oonishi, Yokohama (JP); Ritsuro Orihashi, Tokyo (JP); Yasushi Terui, Tsuchiura (JP); Tsukasa Shishika, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 790 days.

(21) Appl. No.: 11/675,173

(22) Filed: Feb. 15, 2007

(65) Prior Publication Data

US 2008/0073504 A1 Mar. 27, 2008

(30) Foreign Application Priority Data

Feb. 24, 2006 (JP) ............................ 2006-047972
Jun. 21, 2006 (JP) ............................ 2006-171239

(51) Int. Cl.
*H04B 17/00* (2006.01)

(52) U.S. Cl. .................................. 455/226.4; 455/67.7

(58) Field of Classification Search ................. 250/287, 250/281, 305, 394
See application file for complete search history.

(56) References Cited

U.S. PATENT DOCUMENTS 4,717,954 A * 1/1988 Fujita et al. ................. 358/523
4,829,584 A * 5/1989 Shimano ..................... 382/274
5,396,285 A * 3/1995 Hedberg et al. ............. 348/163
6,280,081 B1 * 8/2001 Blau et al. ...................... 374/1
6,567,124 B1 * 5/2003 Tran ........................... 348/255
6,792,253 B2 * 9/2004 Osaka ..................... 455/226.4
7,084,393 B2 * 8/2006 Fuhrer et al. ................ 250/283
7,265,346 B2 * 9/2007 Whitehouse et al. ........ 250/287
7,365,313 B2 * 4/2008 Fuhrer et al. ................ 250/287
7,395,548 B2 * 7/2008 Runzo ........................ 725/107
7,456,398 B2 * 11/2008 Senko et al. ................ 250/292
7,476,850 B2 * 1/2009 Oonishi et al. .............. 250/287
2001/0012763 A1 * 8/2001 Osaka .......................... 455/63
2003/0022645 A1 * 1/2003 Runzo ..................... 455/226.2

FOREIGN PATENT DOCUMENTS

JP 2003-329740 11/2003
JP 2005-166627 6/2005
JP 2005-268152 9/2005
JP 2006-236795 9/2006

* cited by examiner

*Primary Examiner*—Jack I Berman
*Assistant Examiner*—Johnnie L Smith
(74) *Attorney, Agent, or Firm*—Antonelli, Terry, Stout & Kraus, LLP.

(57) ABSTRACT

In a data acquisition system of ADC system, a log amplifier is provided at the pre-stage of an A/D converter, a signal amplified by the log amplifier having a nonlinear input-output characteristic is A/D-converted, and an adding operation of data is performed while reconverting a voltage value data which is converted to a nonlinear characteristic to data with a linear scale according to a table memory for reverse-log conversion. A known voltage value is inputted into the log amplifier to perform measurement, and calibration of the table memory is performed by storing the voltage value and the voltage value data after A/D-converted.

10 Claims, 8 Drawing Sheets

TABLE MEMORY
(REVERSE-LOG CONVERSION TABLE)

| ADR | Dout (Data) |
|---|---|
| 0 | 1.0 |
| 1 | 1.05 |
| 2 | 1.10 |
| | |
| 254 | 1999 |
| 255 | 2000 |

DATA ACQUISITION SYSTEM

CROSS-REFERENCE TO RELATED APPLICATION

The present application claims priority from Japanese Patent Application No. JP 2006-47972 filed on Feb. 24, 2006, and Japanese Patent Application No. JP 2006-171239 filed on Jun. 21, 2006, the contents of which are hereby incorporated by reference into this application.

TECHNICAL FIELD OF THE INVENTION

The present invention relates to a data acquisition system for a measurement apparatus using an A/D converter (analog/digital converter), in particular to a technique effectively applied to a Time Of Flight Mass Spectrometer.

BACKGROUND OF THE INVENTION

For example, a Time Of Flight Mass Spectrometer (TOF-MS) as an example of a measurement apparatus using an A/D converter is an apparatus which analyzes a component included in a sample by ionization and accelerating the sample at a constant voltage, and measuring the flight time and the signal intensity according to mass and electrical charge of the sample. In the TOF-MS, since waveforms of detection signals differ according to the number of ions detected at a time, data acquisition of ADC (analog to digital converter) system is generally used in order to measure the detection signal quantitatively. The data acquisition system of ADC system is a system which acquires digital data showing time data and a voltage value of an ion detection signal by sampling the ion detection signal which is an analog signal at a constant cycle using the A/D converter.

In resent mass spectrometers, according to sensitivity improvement of the ion detector, the intensity difference of an ion signal to be measured increases. Accordingly, an A/D converter which can perform sampling to a wide voltage range with high precision at high speed is required. However, there is a problem that, since the effective number of bits of a high-speed (1 to 2 Gsps) A/D converter commercially available is only about 8 to 10 bits, a dynamic range (signal intensity resolution) becomes deficient in such measurement that intensity of a detection signal changes at least dozens of times, so that measurement sensitivity (S/N ratio) degrades largely.

Generally, in order to realize an extremely-high dynamic range, such a problem is solved by using a plurality of A/D converters, but when a plurality of A/D converters are used, the number of steps for designing, members cost and the like of a fast hardware are increased, so that high cost and lengthening of a development period become problematic.

SUMMARY OF THE INVENTION

In an apparatus where a detection signal waveform does not always become constant at every measurement, such as a TOF-MS, a statistical data processing is required for improving the measurement sensitivity (S/N ratio) of detection signal, and specifically, it is required to perform plural times of measurement and perform an adding operation of measured data.

As a method for solving the problem using a single A/D converter without increasing the bit number, it is thought to increase a dynamic range by providing an amplifier having a nonlinear gain characteristic at a pre-stage of the A/D converter.

However, although measurement in a wide dynamic range can be realized by the nonlinear amplifier, since measured data acquired is not data with a linear scale, the adding operation of simply-acquired data cannot be performed, so that the conventional technique cannot be applied to a data acquisition requiring adding operation such as TOF-MS.

Consequently, the present invention solves such a problem of the conventional technique as described above, and provides a data acquisition system of ADC system using an A/D converter where measurement in a high dynamic range is realized by using a nonlinear amplifier at the pre-stage of the A/D converter without increasing the number of bits of the A/D converter, and an adding operation of sampling data acquired in a state of nonlinear scale is made possible by converting nonlinear scale data to linear scale data using a table memory for reverse-log conversion without using a complex arithmetic processor.

Novel characteristics of the present invention will be apparent from the description of this specification and the accompanying drawings.

The typical ones of the inventions disclosed in this application will be briefly described as follows.

A first realizing means of the present invention provides a log amplifier at the pre-stage of an A/D converter in a data acquisition system of ADC system, implement A/D-conversion of a signal amplified by the log amplifier having a nonlinear input-output characteristic, and performs an adding operation of data while reconverting voltage value data converted to a nonlinear characteristic to data with a linear scale according to a table memory for reverse-log conversion.

Further, the first realizing means provides a gain regulator having a linear gain characteristic in parallel with the log amplifier, and switches amplifiers to be used according to an object to be measured to perform the adding operation of data.

Next, a second realizing means inputs a known voltage value to the log amplifier to perform measurement, and stores the set voltage value and voltage value data after A/D-conversion to perform calibration of a table memory used for reverse-log conversion.

These and other objects, features and advantages of the invention will be apparent from the following more particular description of preferred embodiments of the invention, as illustrated on the accompanying drawings.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
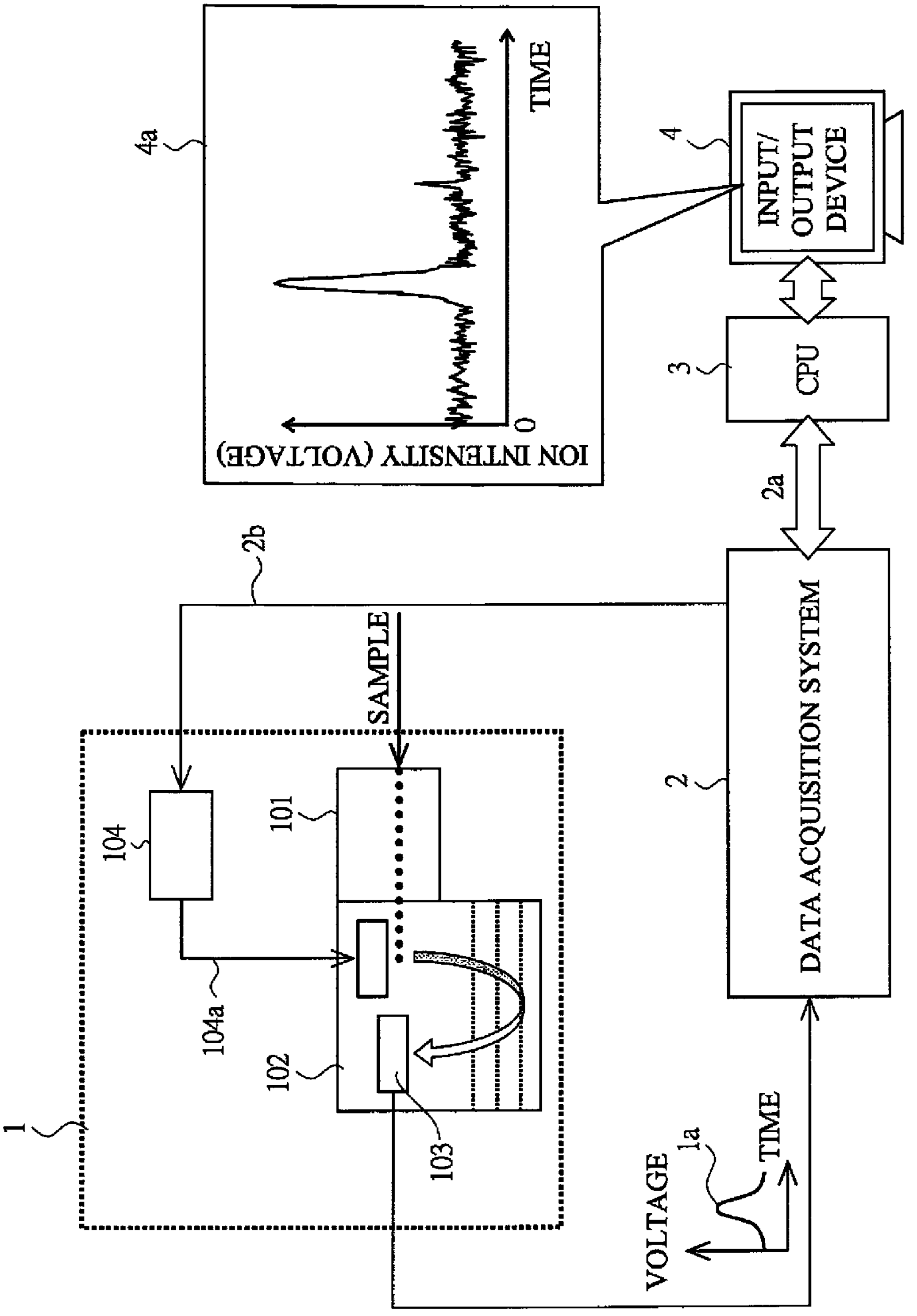
FIG. 1 is a diagram showing an outline of a configuration and operation of a mass spectrometer applied with a data acquisition system of the present invention.

First, as for a mass spectrometer (TOF-MS) applied with a data acquisition system of the present invention, outline of a configuration and operation thereof will be described with reference to FIG. 1. FIG. 1 shows outline of a configuration and an operation of the mass spectrometer.

A mass spectrometer 1 comprises an interface 101 which ionizes a sample to be analyzed, a Time-Of-Flight region (TOF region) 102 which applies a voltage to the ionized sample to accelerate the ion and causes the ion to move toward a detector, the detector 103 which detects the moving ion, a pulser 104 for generating a pulse signal 104*a* which determines a timing of accelerating ion, and the like.

The mass spectrometer 1 is connected with a data acquisition system 2 for measuring and acquiring a voltage value and the flight time of an ion detection signal 1*a* generated from the detector 103, a CPU 3 for controlling the data acquisition system 2 and analytically-processing acquired data 2*a*, an input-output device 4 for displaying the measurement result and an analysis result 4*a* of the analytical processing, through which a user can perform apparatus control, and the like.

In the mass spectrometer 1, the sample to be analyzed is ionized in the interface 101 and sent in the TOF region 102 simultaneously with a measurement starting signal 2*b*. The ion which enters the TOF region 102 is applied with a voltage at a timing of the pulse signal 104*a* to move inside the TOF region 102 in a vacuum state along an orbit such as an arrow shown in FIG. 1. When the ion reaches (hits) the detector 103, the ion detection signal 1*a* having intensity largely in one polarity as shown in FIG. 1 is outputted from the detector 103.

The ion detection signal 1*a* is inputted into the data acquisition system 2 and data thereof is acquired or collected. Since a signal waveform detected at every measurement does not always become constant in the mass spectrometer 1, a statistical data processing is required, and, specifically, plural times of measurement are performed and an adding operation of all data is performed to improve measurement sensitivity (S/N ratio) of the ion detection signal. Here, measurement of the ion which moves due to single pulsing operation is called TOF scan, and measurement performed by repeating the TOF scan plural times is called TOF measurement.

When the Time-Of-Flight measurement is terminated, and added data 2*a* acquired in the data acquisition system 2 is then outputted in the input-output device 4 via the CPU 3. The measurement result is displayed as the mass spectrum 4*a* as shown in FIG. 1, and the user can analyze a component included in the sample from intensities (voltage values) of individual spectrums and times (quantities) thereof.

Figure 2:
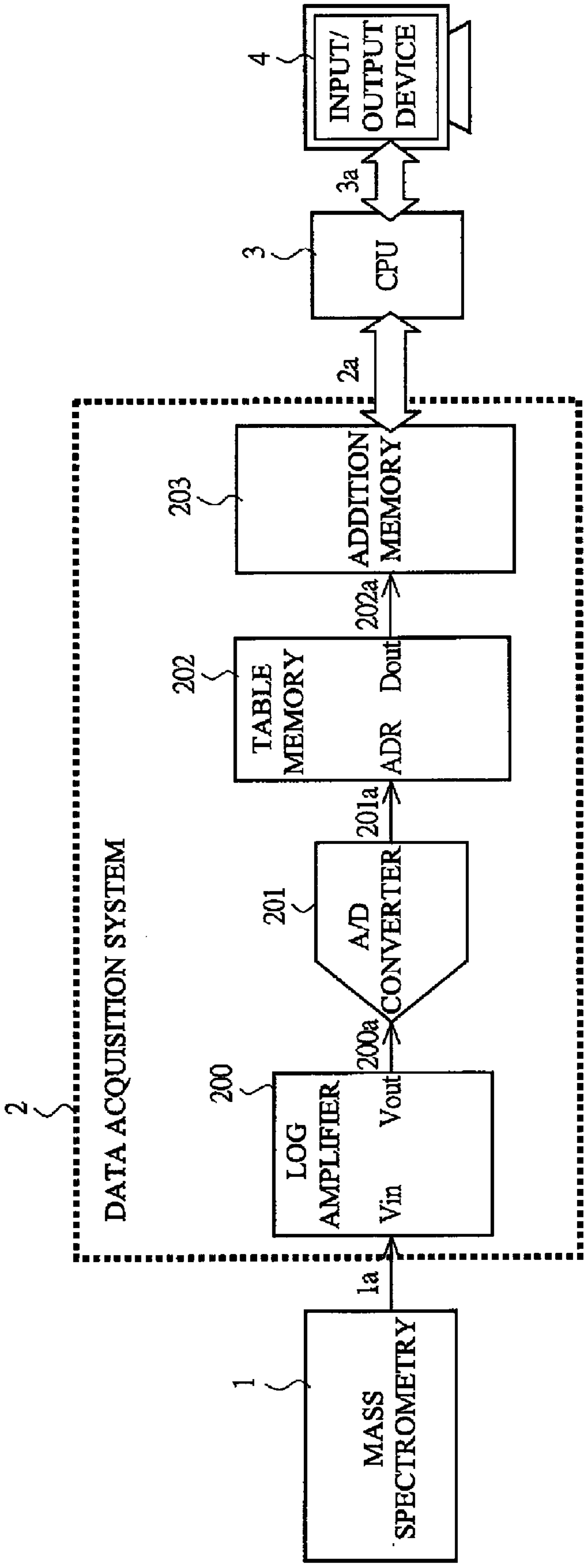
FIG. 2 is a diagram showing a configuration of a data acquisition system in a mass spectrometer of a first embodiment of the present invention.

Next, with reference to FIG. 2, one example of a configuration of the data acquisition in the first embodiment will be described. FIG. 2 shows the configuration of the data acquisition system.

The data acquisition system 2 which is the first embodiment comprises a log amplifier 200 for amplifying an ion detection signal 1*a* from the mass spectrometer 1, an A/D converter 201 for converting an output waveform 200*a* from the log amplifier 200 to digital data, a table memory 202 for performing data conversion according to an output value 201*a* of the A/D converter 201, and an addition memory 203 for performing an adding operation of measurement data 202*a* and storing the result of the adding operation in a memory.

Though omitted in FIG. 2, the A/D converter 201 is generally of a differential signal input type, and it may be of a single input. At a single input time, a reference voltage of an input signal can be offset by applying a DC voltage to a terminal on an inverting input side. A clock generator is mounted inside the data acquisition system 2. The A/D converter 201, the table memory 202, and addition memory 203 operate in synchronization with a master clock from the clock generator.

Figure 3:
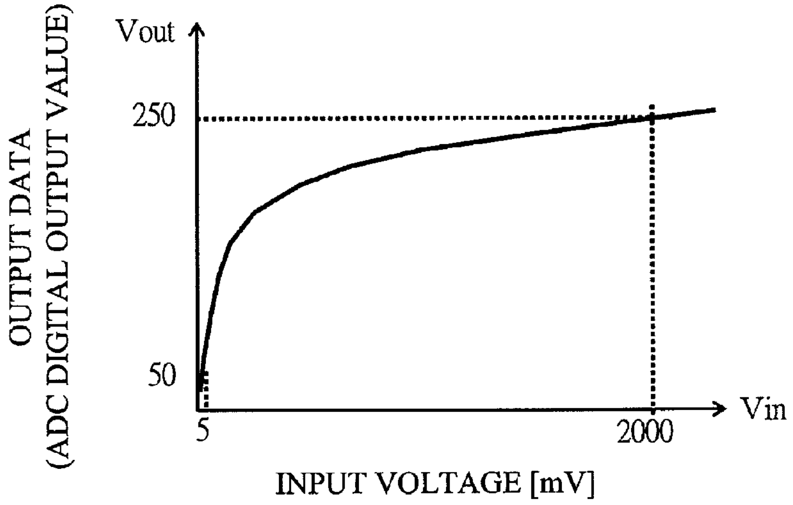
FIG. 3 is a diagram showing a relationship between an input voltage and an output voltage of a log amplifier in the mass spectrometer of the first embodiment of the present invention.

Next, outline of operation of the data acquisition system in the first embodiment will be described with reference to FIG. 3. FIG. 3 shows one example of a relationship between an input voltage and an output voltage of the log amplifier.

When measurement is started, the ion detection signal 1*a* from the mass spectrometer 1 is inputted into the log amplifier 200, and the signal is amplified according to a nonlinear input-output characteristic (FIG. 3) which the log amplifier 200 has. A relationship between an input voltage Vin and an output voltage Vout of the log amplifier 200 is expressed by Equation 1.

$$Vout = k \cdot Log(Vin) \qquad \text{(Equation 1)}$$

The ion detection signal 1*a* amplified due to the input-output characteristic shown in FIG. 3 is sampled in a certain time period in the A/D converter 201, and converted to voltage value data 201*a* at each time. The voltage value data is expressed by a Digital output value, and for example when the A/D converter of 8 bits is used, a value of 0 to 255 (decimal number) is outputted at every sampling time. In a conventional data acquisition system, the data after A/D-converted is subjected to the adding operation as it is, but the data 201*a* after A/D-converted in the first embodiment is a nonlinear value amplified by the log amplifier 200, so that the data cannot be subjected to the adding operation as it is.

Consequently, in the first embodiment, the voltage value data 201*a* from the A/D converter 201 is reverse-log(linear)-converted by the table memory 202. Voltage value data for reverse-log conversion calculated back from the characteristic of the log amplifier 200 is preliminarily stored in the table memory 202 before measurement, so that, only by reading contents of the memory using the voltage value data 201*a* from the A/D converter 201 as an address, voltage value data having a linear characteristic before amplified by the log amplifier 200 can be outputted.

Figure 4:
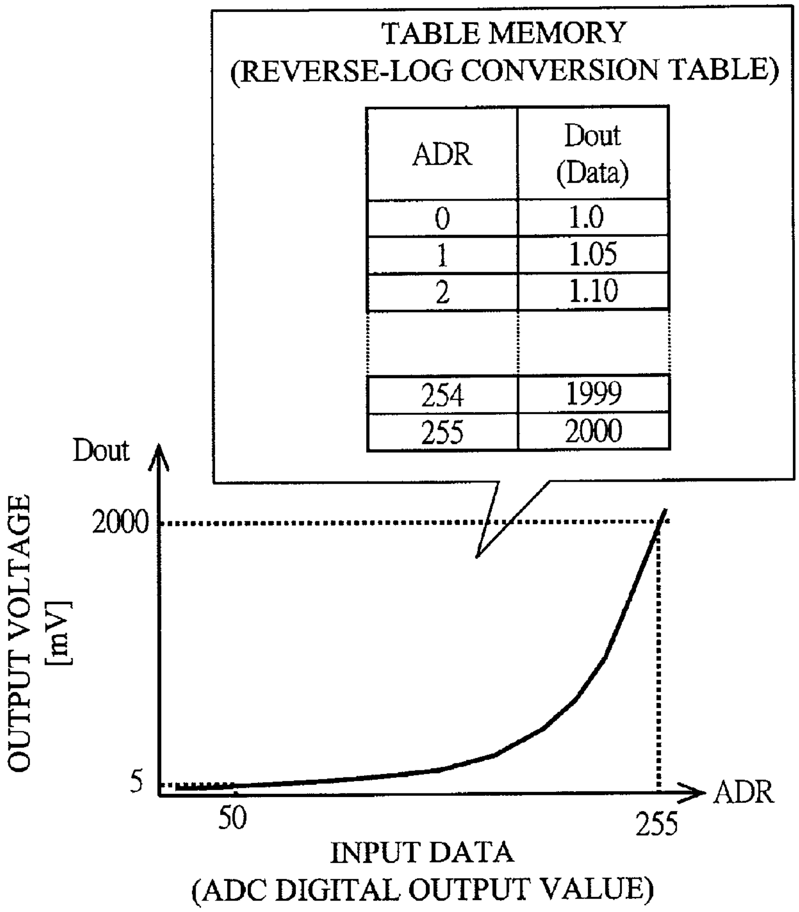
FIG. 4 is a diagram showing contents (the relationship between the input voltage and the output voltage) of a table memory in the mass spectrometer of the first embodiment of the present invention.

Next, one example of the contents of the table memory used in the first embodiment will be described with reference to FIG. 4. FIG. 4 shows one example of the content (the relationship of the input voltage and the output voltage) of the table memory.

In the table memory 202, an address range of the memory is set to the same number as the Digital output number of the A/D converter 201 to be used, and an addresses of 0 to 255 are prepared on the assumption of the A/D converter of 8 bits in FIG. 4. The table memory 202 is rewritable by the CPU 3, and voltage value data showing a reverse characteristic from that of FIG. 3 is preliminarily stored in each address, so that an output voltage value is determined by a Digital output of the A/D conversion to be inputted.

That is, by reading memory data using input data from the A/D converter 201 as an address ADR (0 to 255 address) at a measurement time, an input voltage value before amplified by the log amplifier 200 can be acquired without requiring a computer processing. For example, in the table memory shown in FIG. 4, when "255 (decimal number)" is received as the voltage value data 201*a*, "2000" [mV] stored in the address is outputted. Since a voltage value which is reverse-log-converted and read in this manner is a voltage value with a linear scale before amplified by the log amplifier 200, adding operation becomes possible.

Next, the voltage value data linearly converted by the table memory 202 is inputted into the addition memory 203 and stored in the addition memory. When data has already been stored in the addition memory, the contents of the addition memory is once read, and the current voltage value data is added to the contents, and the voltage value data is then stored in the addition memory again. Here, when all sampled data of an ion signal for one measurement is acquired, the TOF scan is terminated. Further, the TOF scan can be repeated only by the number of times determined by the user, and when all the number of TOF scans are performed, the TOF measurement is terminated.

As described above, according to the data acquisition system 2 of the first embodiment, since the log amplifier 200 having the nonlinear input-output characteristic is used at the pre-stage of the A/D converter 201, measurement in high dynamic range is realized without increasing the bit number of the A/D converter 201, and since the adding operation of the data is made possible by converting the data to a value of linear scale by the reverse-log conversion processing using the table memory 202 where a signal 200*a* amplified by the log amplifier 200 is preliminarily generated, the data acquisition of ADC system where high sensitivity of the measurement due to data adding operation is realized simultaneously with the measurement in high dynamic range can be provided.

Incidentally, the above data processing method used by the data acquisition system of the first embodiment can be applied as a data processing method of a measurement apparatus other than TOF-MS.

Second Embodiment

Figure 5:
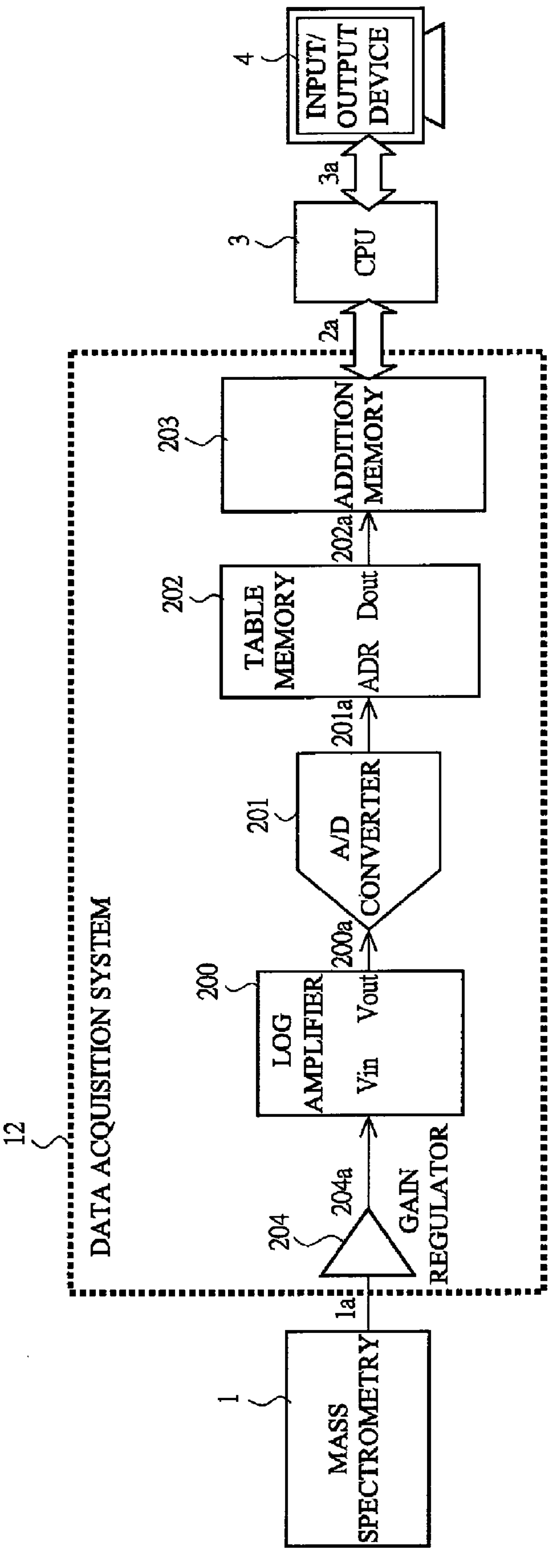
FIG. 5 is a diagram showing a configuration of a data acquisition system in a mass spectrometer of a second embodiment of the present invention.

Next, a configuration of a data acquisition and a data processing method in a second embodiment of the present invention will be described with reference to FIG. 5. FIG. 5 shows the configuration of the data acquisition system.

A data acquisition system 12 of the second embodiment is characterized in that a gain regulator is provided at the pre-stage of the log amplifier 200 in addition to the configuration of the first embodiment, and as for the other portions, configurations thereof are the same as the configurations of the first embodiment.

In the first embodiment, the input-output characteristic (FIG. 3) of the log amplifier has been explained, but at a portion near a lower limit of the input voltage range of the log amplifier, the gain changes rapidly with respect to an input voltage, so that the gain changes largely due to a slight change of the input voltage and variation of an output voltage becomes large. On the contrary, at a portion near an upper limit of the input voltage range, since change of the gain with respect to the input voltage is small, the output voltage becomes stable, but slight change of the input voltage changes the output voltage largely at reverse-log conversion.

Consequently, in the second embodiment, since an arbitrary range of the input-output characteristic which the log amplifier 200 has can be used by providing the gain regulator 204 at the pre-stage of the log amplifier 200 as shown in FIG. 5 to make the input voltage of the log amplifier 200 adjustable, for example, a range where gain variation of the log amplifier 200 is small can be selected.

In the second embodiment, when the TOF measurement is started, the ion detection signal 1*a* from the mass spectrometer 1 is inputted into the gain regulator 204. The gain regulator 204 is controlled by the CPU 3, so that an input signal can be amplified with an arbitrary gain amount which is set by the user. At this time, the CPU 3 adjusts the output signal 204*a* from the gain regulator 204 within the range of the input voltage which the log amplifier 200 has, and performs gain adjustment such that an output of the log amplifier 200 does not exceed the input voltage range of the A/D converter 201.

The signal 204*a* which is amplitude-adjusted by the gain regulator 204 is inputted into the log amplifier 200, and amplified according to the nonlinear input-output characteristic which the log amplifier 200 has. The amplified ion detection signal 200*a* is sampled by the A/D converter 201 like the first embodiment, and reverse-log(linear)-converted by the table memory 202, then subjected to adding operation in the addition memory 203.

As described above, according to the data acquisition system 12 of the second embodiment, since a use range of the input-output characteristic which the log amplifier 200 has can be adjusted to an arbitrary range by adjusting the input voltage of the log amplifier 200 by the gain regulator 204 provided at the pre-stage of the log amplifier 200, the data acquisition system of ADC system where higher precision of measurement is realized can be provided in addition to the effect described in the first embodiment.

Third Embodiment

Figure 6:
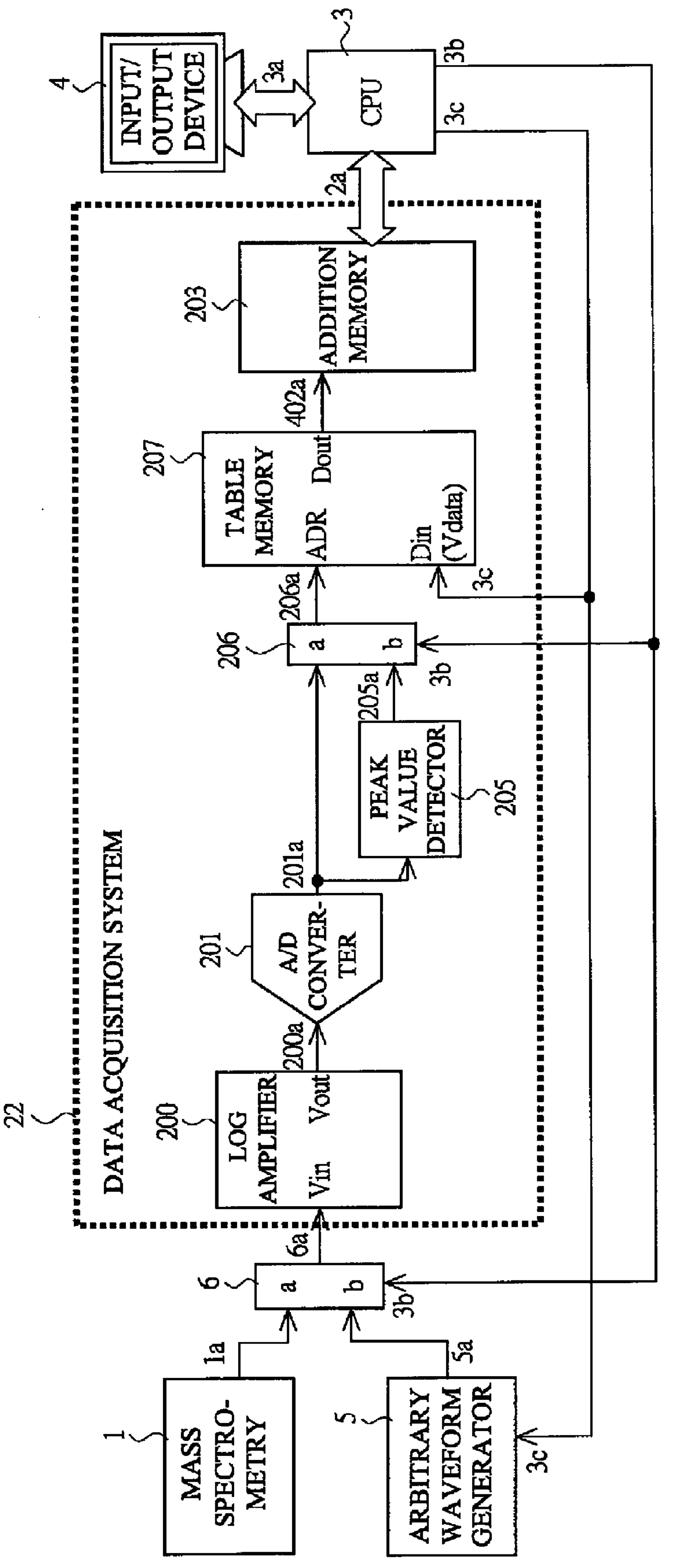
FIG. 6 is a diagram showing a configuration of a data acquisition system in a mass spectrometer of a third embodiment of the present invention.

Next, a configuration of a data acquisition system and a data processing method in a third embodiment of the present invention will be described with reference to FIG. 6. FIG. 6 shows the configuration of the data acquisition system.

A data acquisition system 22 of the third embodiment is characterized in that a peak value detector 205 which can detect the maximum value from the digital data 201*a* sent from the A/D converter 201 in calibration, a table memory 207 where data 3*c* can be written from the CPU 3 in calibration, an internal signal selector 206 which selects an input data path of the table memory 207, an arbitrary waveform generator 5 as a separate signal input device from the data acquisition system 22, and an external signal selector 6 which switches the input signal of the data acquisition system 22 are provided in addition to the configurations of the first and second embodiments.

Configurations of the other portions are the same as the first and second embodiments. Note that, the arbitrary waveform generator 5 shown in FIG. 6 is a waveform generator which can set a cycle of an output signal, a kind of a waveform (a sine wave, a rectangular wave, or the like), and a voltage value (an effective value or the maximum value), and it is not limited to a specific one.

The table memory 207 of the third embodiment is subjected to rewrite by calibration, but it is a memory where data can be written directly from the CPU 3 like the first and second embodiments.

A voltage value data for reverse-log conversion preliminarily obtained from a characteristic of the log amplifier 200 is stored in the table memory 202 used in the first and second embodiments, but in the third embodiment, before actual measurement, calibration for producing the table memory 207 for reverse-log conversion is performed by performing a measurement of known waveform through the log amplifier 200.

The calibration is performed before the TOF measurement, the input-output characteristic of the log amplifier 200 is measured using a signal having a known voltage value generated from an external device, and a conversion table for reverse-log conversion can be produced from the voltage value data before and after amplified by the log amplifier 200.

Figure 7:
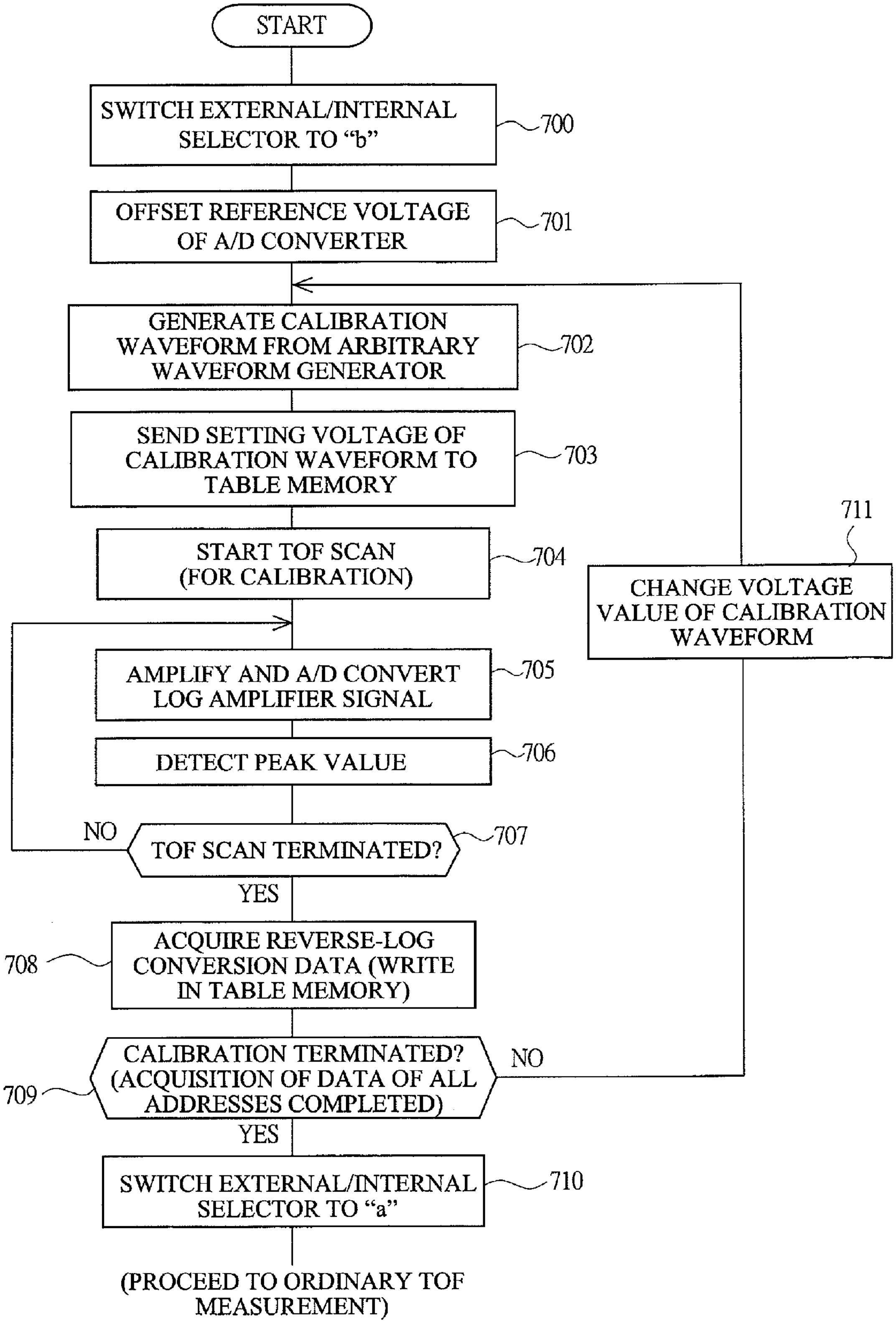
FIG. 7 is a flowchart showing a process flow of calibration of a table memory in the mass spectrometer of the third embodiment of the present invention.

A flow of a data processing in calibration in the third embodiment will be described with reference to a flowchart in FIG. 7. FIG. 7 shows a process flow of calibration of the table memory.

When calibration is started, the CPU 3 first controls the external signal selector 6 located outside the system to switch the input of the data acquisition system 22 to a signal path b from the external arbitrary waveform generator 5. Simultaneously, the internal signal selector 206 of the data acquisition system 22 is switched to "b" side such that a signal from the peak value detector 205 is inputted (process 700). Next, in the calibration, the A/D converter 201 is used by single-input mode, an offset voltage (DC voltage) is applied to the inverting input terminal side to perform the TOF scan once, and adjustment of the offset voltage is repeated until the digital output of the A/D converter 201 becomes the value which means 0 [V], under the condition of no signal input (process 701).

Next, the CPU 3 controls the arbitrary waveform generator 5 to generate a signal 5*a* (a sine wave of single frequency in the present embodiment) having a known voltage value, and the signal 5*a* is inputted into the data acquisition system 22 (process 702). The CPU 3 transmits a maximum voltage value data 3*c* of the sine wave 5*a* which is set to the arbitrary waveform generator 5 to the table memory 207 in the data acquisition system 22 (process 703).

Next, the CPU 3 starts the TOF scan for calibration (process 704). The sine wave 6*a* inputted into the data acquisition system 22 is amplified by the log amplifier 200 and sampled by the A/D converter 201 (process 705). The peak value detector 205, which received the digital data 201*a* from the A/D converter 201, detects digital data showing the maximum voltage value from all data received before the TOF scan is terminated (process 706).

After the TOF scan is terminated (process 707), the table memory 207 uses the maximum voltage value data 205*a* from the peak value detector 205 as an address, and a voltage value data 3*c* sent from the CPU 3 is stored in the address (process 708).

In the present calibration, until data of all addresses of the table memory 207 is acquired, processes 702 to 708 are repeated while changing the voltage value of the sine wave 5*a* generated from the arbitrary waveform generator 5 (process 711).

When provided that a range of voltage value of a waveform to be measured at a normal measurement time is known and it is known that the data is not required to be included in all the addresses of the table memory 207, the CPU 3 may make a determination of calibration termination while confirming the content of the memory.

Further, in the above flow, the number of TOF scan in calibration is set to one, but precision of the maximum voltage value measurement can be improved by setting the number of measurement time to N and obtaining an average value from an added maximum voltage value data stored in the addition memory.

When the data is written in all the addresses of the table memory 207, and calibration is terminated (process 709), the CPU 3 switches the external signal selector 6 and the internal signal selector 206 to "a" side, the input signal of the data acquisition system 22 is set to a signal from the mass spectrometer 1, and the input data path of the table memory 207 is set to a signal from the A/D converter 201 (process 710), and sequentially the same TOF measurement as the first and second embodiment can be performed.

As described above, according to the data acquisition system 22 in the third embodiment, since the signal having a known voltage value generated from the external system is used to measure the input-output characteristic of the log amplifier 200, and the voltage value data before and after amplified by the log amplifier 200 is acquired, the conversion table for reverse-log conversion based on an actual characteristic of the log amplifier 200 used in the data acquisition system 22 can be generated, and further, high-precision measurement becomes possible.

Note that, in calibration of the third embodiment, the technique for acquiring the data of all the addresses of the table memory 207 is explained, but such a technique may be employed that several input-output voltages of the input-output characteristics which the log amplifier 200 has are acquired by calibration, an interpolation processing is performed by the CPU 3 from the several data, and a voltage value calculated by the processing is written directly in the table memory 207.

The above described calibration may be performed at every measurement, or it is possible to save the content of the table memory which is once acquired in the CPU as calibration data, and load the calibration data before measurement.

Figure 8:
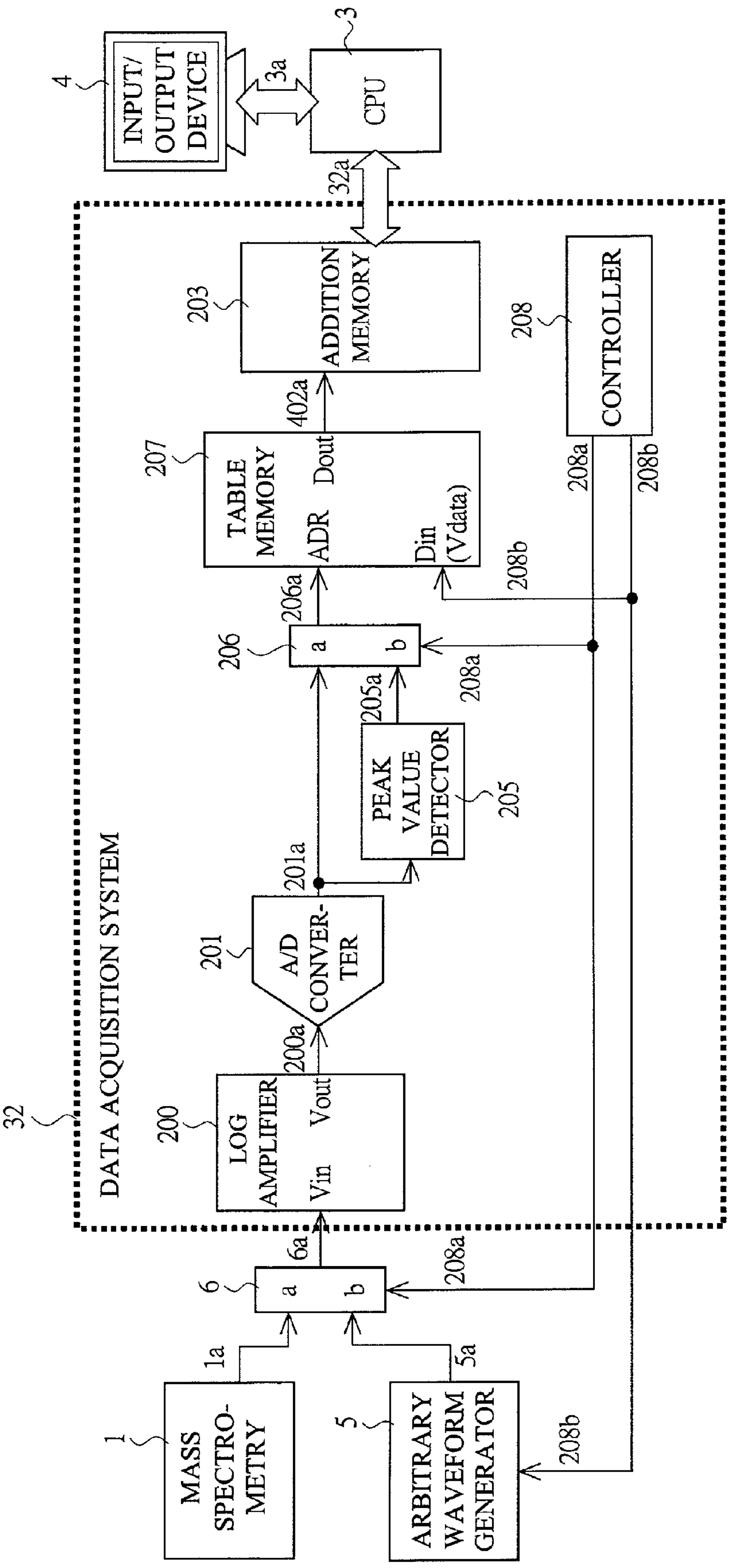
FIG. 8 is a diagram showing an example of the configuration of the data acquisition system in the mass spectrometer of the third embodiment of the present invention.

A switching control of the signal path is performed by the CPU 3 in FIG. 6, but the switching control may be performed by a controller 208 provided in the data acquisition system 32, as shown in FIG. 8.

The external signal selector 6 is used for switching the path of the input signal in FIG. 6 and FIG. 8, but a cable may be reconnected manually.

Fourth Embodiment

Next, a configuration of a data acquisition system and a data processing method in a fourth embodiment of the present invention will be described with reference to FIG. 9.

Figure 9:
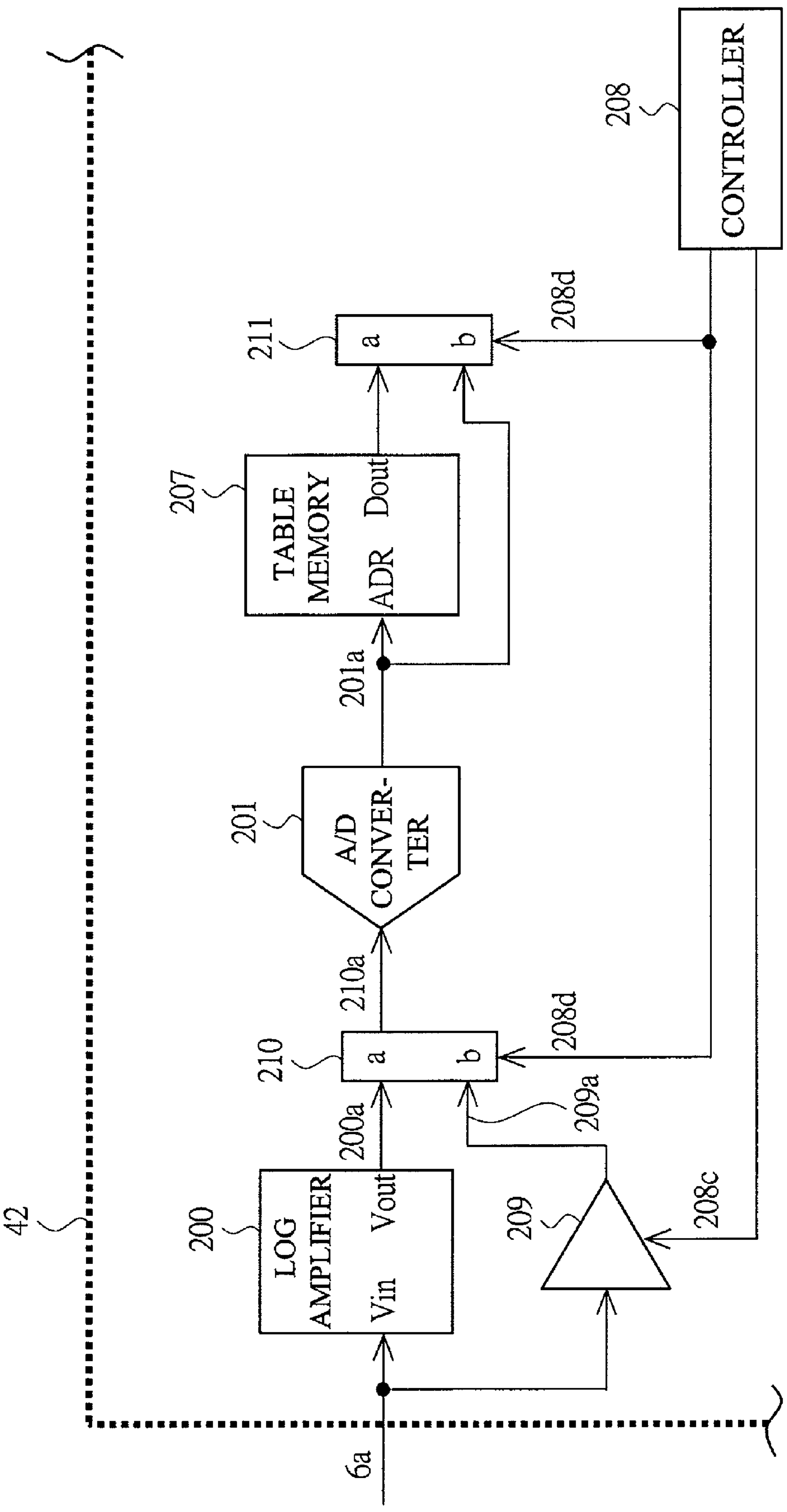
FIG. 9 is a diagram showing a configuration of a data acquisition from a signal inputting unit to a table memory in a mass spectrometer of a fourth embodiment of the present invention.

FIG. 9 shows the configuration of the data acquisition from the signal input device to the table memory.

A data acquisition system 42 of the fourth embodiment is characterized in that the log amplifier 200 and the gain regulator 209 which are configured in parallel are provided at the pre-stage of the A/D converter 201, and a switch 210 for switching two kinds of amplifiers and a switch 211 for switching paths of the voltage value data 201*a* after A/D-converted are provided. Configurations of the other portions are the same as the first to third embodiments.

The gain regulator 209 is an amplifier having a linear gain characteristic, and an arbitrary gain amount can be set by a gain setting signal 208*c* from the controller 208. The gain regulator 209 and the log amplifier 200 are configured in parallel at the pre-stage of the A/D converter 201, and each output is inputted into the switch 210. The switch 210 can switch an amplifier to be used by a switching signal 208*d* from the control circuit 208.

Similarly, the switch 211 can switch which to input the voltage value data after A/D-converted to the table memory 207 or to input the voltage value data to the addition memory as it is, by the switching signal 208*d* from the control circuit 208.

Here, when the log amplifier 200 is selected, conversion of a voltage value (reverse-log conversion mode) is performed using the table memory 207 for reverse-log conversion produced based on the characteristic of the log amplifier 200, as explained in the first to third embodiments.

On the other hand, when the gain regulator 209 is selected, a mode (through mode) which the input voltage value is outputted as it is without using the reverse-log conversion table is selected by the amplifier selection signal 208*d* outputted from the control circuit 208. Note that, a path for inputting the voltage value data directly to the addition memory is provided in FIG. 9, but a table memory whose input value and output value are equivalent may be used.

Further, output of the arbitrary waveform generator 5 used for calibration of the table memory 207 is ideally "setting voltage 208*b*=out put voltage 5*a*", but actually a difference is generated between the setting voltage and the output voltage due to an error of the generator itself or loss in the cable or the like. In such a case that precision is required for an absolute value of a conversion voltage stored in the table memory 207, it is necessary to correct an output characteristic of the arbitrary waveform generator itself.

In the fourth embodiment, a gain (input-output) characteristic of the arbitrary waveform generator 5 can be obtained by setting the gain of the gain regulator 209 to 1-fold, and measuring the absolute voltage value while changing amplitude of the output signal 5*a* of the arbitrary waveform generator 5. In calibration of the table memory for reverse-log conversion explained in the third embodiment, high-precision calibration can be performed by setting the voltage value which is corrected based on the gain characteristic.

In this manner, according to the fourth embodiment, since the log amplifier 200 having the nonlinear gain characteristic and the gain regulator 209 having the linear characteristic are provided in parallel, a data adding operation in a high dynamic range using the log amplifier 200 and a high-precision data adding operation using the gain regulator 209 are switched and used according to a measuring object.

Moreover, since amplifiers which are different in gain characteristic are switched and used, measurement in a high dynamic range or a high-precision measurement becomes possible in a single system.

By measurement using the gain regulator 209, calibration of a gain characteristic which an external arbitrary waveform generator 5 used for calibration of the table memory 207 has can also be performed.

The effects obtained by typical aspects of the present invention will be briefly described below.

According to the present invention, in the data acquisition system of ADC system used in a spectrometer such as TOF-MS, it can be realized that the data acquisition system of ADC system where measurement in a high dynamic range without increasing the bit number of the A/D converter by using the log amplifier at the pre-stage of the A/D converter, and along with that, it can provide adding operation of a sampling data obtained by a nonlinear scale is made possible by converting nonlinear scale data to a linear scale by using the table memory for reverse-log conversion without using a complex arithmetic processing circuit.

Further, since the gain regulator having the linear gain characteristic is provided in parallel with the log amplifier, and they can be switched and used according to the measuring object, it is possible to provide the data acquisition system of ADC system where measurement in a high dynamic range or a high-precision measurement is possible.

Furthermore, since the gain regulator having a linear gain characteristic is provided in parallel with the log amplifier, and they can be switched and used with a simple configuration, measurement in a high dynamic range or a high-precision measurement is possible with a single system.

Still further, since the gain regulator having a linear gain characteristic is provided in parallel with the log amplifier, and they can be switched and used according to the measuring object, measurement in a high dynamic range or a high-precision measurement is possible with a single system, and low price and size reduction can be realized because the present invention does double duty.

Finally, since the amplifier of the linear gain characteristic is further provided and the absolute voltage value of the input signal can be measured, the present invention can also be used for calibration of a gain characteristic which an external signal generator has.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data acquisition system using an A/D converter comprising:

a log amplifier which amplifies an inputted analog signal with a nonlinear input-output characteristic;

an A/D converter which samples an output signal from the log amplifier;

a table memory including a correspondence table of address and voltage value data with a linear scale, which reverse-log-converts the sampled signal from the A/D converter to a voltage value data based on the correspondence table; and an addition memory which stores the data converted to the linear scale while adding the same.

2. The data acquisition system according to claim 1, comprising:

a gain regulator which can adjust the gain of an input signal, provided at the pre-stage of the log amplifier.

3. The data acquisition system according to claim 1, comprising:

a gain regulator having a linear gain characteristic and a first switch provided in parallel with the log amplifier at the pre-stage of the A/D converter; and comprising: a second switch provided at the post-stage of the table memory, wherein switching is performed, to the log amplifier or the gain regulator.

4. The data acquisition system according to claim 1, wherein a known voltage value is inputted into the log amplifier to perform measurement, and the setting voltage value and voltage value data after A/D conversion can be stored in the table memory.

5. The data acquisition system according to claim 1, wherein the data in the table memory can be rewritten to arbitrary value by a CPU controlling the data acquisition system.

6. The data acquisition system according to claim 1, wherein the data acquisition system is used in a Time-Of-Flight mass spectrometer.

7. The data acquisition system according to claim 6, wherein the Time-of-Flight mass spectrometer comprises: an interface which ionizes a sample to be analyzed; a Time-Of-Flight region which applies a voltage to the ionized sample to accelerate the ion and causes the ion to move toward a detector; the detector which detects the moved ion; and a pulser which generates a pulse signal which determines a timing of accelerating the ion.

8. The data acquisition system according to claim 1, wherein an address range of the correspondence table is set to the same number as the digital output number of the A/D converter.

9. The data acquisition system according to claim 1, wherein the log amplifier amplifies the inputted analog signal based on an arbitrary nonlinear input-output characteristic;

wherein the voltage value data of the correspondence table shows a reverse characteristic from that of the arbitrary nonlinear input-output characteristic of the log amplifier.

10. The data acquisition system according to claim 1, wherein the voltage value data reverse-log-converted by the table memory is a voltage value with a linear scale before amplified by the log amplifier.

* * * * *